Patented July 28, 1936

2,049,358

UNITED STATES PATENT OFFICE 2,049,358

PRODUCTION OF CUPROUS CYANIDE

Charles Dangelmajer, Niagara Falls, N. Y., assignor to E. I. du Pont de Nemours & Company, Incorporated, Wilmington, Del., a corporation of Delaware No Drawing. Application August 26, 1933, Serial No. 687,017

6 Claims. (Cl. 23—79)

This invention relates to the production of cuprous cyanide and more particularly to an improved method for producing cuprous cyanide of a high degree of purity from relatively impure raw materials.

Cuprous cyanide has been prepared heretofore by the reaction of a cuprous salt such as cuprous chloride, with an alkali metal cyanide, or by the reaction of a cupric salt, such as cupric sulfate with an alkali cyanide in the presence of a reducing agent. The chief disadvantage of these processes as practiced prior to my invention has been that very pure and relatively expensive raw materials have been required in order to produce cuprous cyanide of sufficiently high purity and light color to meet present trade specifications. Iron compounds in particular have been found to be especially objectionable impurities, as they form highly colored complex cyanogen compounds of which even extremely small amounts are sufficient to cause pronounced discoloration of the product.

Many commercial grades of cyanide contain ferrocyanide as an impurity; furthermore, even the purest grades of cyanide when solutions thereof are handled in iron equipment become somewhat contaminated with ferrocyanide. It is practically impossible to remove ferrocyanide from cyanide solutions because none of the known precipitants for ferrocyanide will function in the presence of free cyanide. Iron is also a common impurity in copper salts, particularly those which have been made from scrap copper, which usually contains appreciable amounts of iron. The removal of iron from solutions such as cuprous chloride is not commercially practicable, as the cost of carrying out any of the known purification methods would more than offset the saving effected by the use of cheaper grades of copper in the preparation of the cuprous chloride solution.

One of the principal obstacles which prevent the precipitation of substantially iron-free cuprous cyanide from solutions containing iron is the fact that the iron compounds usually present in such solutions are of two different types, i. e., simple iron salts such as ferrous chloride, and iron cyanogen compounds such as ferrocyanide. The iron cyanogen compounds are generally soluble in alkaline solutions, but in an acid medium insoluble highly colored compounds are formed. On the other hand, the simple iron salts are soluble in acid solutions but form basic precipitates such a hydroxides in alkaline solutions. Thus, if the cuprous cyanide is precipitated from an acid medium it is contaminated with iron cyanogen compounds; if it is precipitated from an alkaline medium it is contaminated with basic iron compounds.

One method of preparing cuprous cyanide has been proposed which partially overcomes the above-mentioned difficulties. According to this method, an impure alkali cyanide solution containing ferrocyanide is reacted with one-half its equivalent of cuprous salt to form a solution of the double cyanide of copper and the alkali metal. The ferrocyanide is precipitated from this solution by the addition of a zinc salt and the precipitate removed by filtration. The purified double cyanide solution is then reacted with a further portion of cuprous salt to precipitate cuprous cyanide. This procedure eliminates the ferrocyanide present in the cyanide solution, but obviously requires that the copper solution used in the last step of the process be free from iron if a pure product is to be obtained. Furthermore, this process involves an additional precipitation and filtration step which increases the cost of production.

An object of this invention is to provide an improved method of producing cuprous cyanide of a high degree of purity and of a light color. A further object is to utilize relatively impure raw materials in the production of cuprous cyanide. Other objects will appear hereinafter.

These objects are accomplished according to my invention by controlling the condition of precipitation of cuprous cyanide so that all iron compounds in the reacting materials remain in solution. I have discovered that the presence of cuprous chloride in acid solution tends to decompose or prevent the formation of water-insoluble iron cyanogen compounds. I have found that substantially iron free cuprous cyanide can be precipitated from solutions containing iron as long as said solutions are substantially acid in reaction and contain appreciable amount of cuprous chloride.

In one method of preparing cuprous cyanide according to my invention a solution of an alkali metal cyanide is added to an acidic solution of cuprous chloride, which may also contain other salts such as ammonium chloride or an alkali metal chloride in order to increase the solubility of the cuprous chloride. The amount of alkali metal cyanide solution used is slightly less than the theoretical equivalent of the copper so that at the end of the precipitation the solution is acidic and contains an excess of cuprous chloride. The precipitated cuprous cyanide is then filtered from the solution, washed, and dried.

The following example provides a specific illustration of a preferred modification of my invention.

A solution of cuprous chloride is prepared by passing chlorine gas into a sodium chloride brine solution containing a small amount of cupric chloride in contact with scrap copper; then allowing the solution to remain in contact with excess copper until substantially all of the cupric chloride is converted to cuprous chloride. A small amount of sodium bisulfite is added to the solution to insure complete reduction of the copper and to provide free acid in the form of $SO_2$ liberated from the sodium bisulfite. The composition of the resultant cuprous chloride solution may be as follows:

| | Grams/liter |
|---|---|
| Copper | 100 |
| Iron | 0.1 |
| NaCl | 260 |
| $NaHSO_3$ | 3 to 5 |

A solution of sodium cyanide containing 250 to 300 grams of NaCN per liter is gradually added to the above solution with constant agitation until the concentration of copper remaining in solution is approximately 1 gram per liter. During the addition of the sodium cyanide small amounts of sodium bisulfite are added to the reaction mixture from time to time as required in order to have a certain amount of $SO_2$ present at all times. During the precipitation, the heat of reaction is sufficient to raise the temperature of the reacting mixture to 60 to 80° C. The precipitated cuprous cyanide is filtered off and washed, first with hot water containing approximately ½% HCl, then with hot water until the filtrate is substantially free from chlorides. The washed product is dried at 110° C.

Cuprous cyanide prepared in the above manner is pure white to light cream in color and contains over 99.3% cuprous cyanide.

The concentration of acid required in the reaction medium in order to carry out my invention may vary considerably. As little as 0.05% free HCl is generally sufficient to give a good product from raw materials containing the usual amounts of iron as impurity. In general I prefer not to exceed an acidity equivalent to about 1% HCl, as with higher acidities the cuprous cyanide is appreciably soluble and some HCN may be evolved in the course of the reaction. I have found it advantageous to keep the reaction medium in an acid condition, preferably by the use of an acid salt which exerts a buffer action on the solution and thereby facilitates keeping the solution in an acid condition without exceeding the limits of acidity which result in HCN evolution. I prefer to use for this purpose an alkali metal bisulfite which has the additional advantages that the odor of $SO_2$ provides a convenient method of detecting the acid condition of the solution and furthermore, the presence of $SO_2$ in the solution prevents or counteracts atmospheric oxidation of the cuprous salt. In place of or in addition to the bisulfite, gaseous $SO_2$ may be passed into the solution or other known buffering agents may be used.

The use of a reducing agent such as sulfur dioxide or a bisulfite may be dispensed with. However, if reducing agents are not used, I prefer to keep the reacting solution out of contact with air to prevent the formation of cupric compounds by atmospheric oxidation.

The amount of excess cuprous chloride required to prevent precipitation of iron compounds varies somewhat according to the amount of iron present. I have found that as little as 0.5 gram of copper per liter of solution is effective when relatively small amounts of iron are present. When larger amounts of iron are present the excess cuprous chloride concentration may be increased to any desired extent, although there appears to be no advantage in using concentrations higher than 5 grams of copper per liter at the completion of the precipitation.

During the precipitation of the cuprous cyanide, it is generally desirable to add additional acid or acid salt to the reaction mixture from time to time in order to neutralize the alkaline constituents such as carbonate which are generally present in the cyanide. If the solution becomes alkaline during the precipitation, basic iron compounds may be precipitated. Such compounds may be redissolved by subsequent acidification but the solution thereof often is somewhat slow and uncertain; I therefore prefer to keep the solution in an acid condition at all times.

Although I have described my process with particular reference to the use of cuprous chloride as a raw material, I may also use other cuprous salts or cupric salts in conjunction with suitable reducing agents. It is necessary only that cuprous ions and chloride ions also be present during the addition of cyanide in order to provide the necessary cuprous choride in the mother liquor to prevent precipitation of iron cyanogen compounds.

The process of my invention makes it possible to utilize the cheapest sources of copper for the production of a highly pure cuprous cyanide. The process involves only a single precipitation step and may be carried out with a minimum of labor and equipment. For these reasons it affords a more convenient and economical method of preparing cuprous cyanide than has been proposed heretofore.

I claim:

1. A method of producing cuprous cyanide which comprises providing an impure acidic solution of cuprous chloride containing an iron compound and adding thereto a solution of an alkali metal cyanide in such quantity as to precipitate cuprous cyanide and leave in solution a concentration of unreacted cuprous chloride equivalent to 0.5 to 5 grams of copper per liter, while maintaining an acidity equivalent to 0.05 to 1% by weight of hydrogen chloride in said solution and removing precipitated cuprous cyanide from said solution.

2. Method of producing cuprous cyanide which comprises providing an impure acidic solution of cuprous chloride containing an iron compound and adding thereto a solution of an alkali metal cyanide in such quantity as to precipitate cuprous cyanide and leave in solution a concentration of cuprous chloride equivalent to 0.5 to 5 grams of copper per liter while maintaining said solution in an acidic condition by the addition of suitable quantities of an acidic reducing agent and removing precipitated cuprous cyanide from said solution.

3. Method of producing cuprous cyanide which comprises providing an impure acidic solution of cuprous chloride containing an iron compound and adding thereto a solution of sodium cyanide in such quantity as to precipitate cuprous cyanide and leave in solution a concentration of cuprous chloride equivalent to 0.5 to 5 grams of copper per liter, while maintaining said solution in an acidic condition by the addition of suitable quantities of sulfur dioxide and removing precipitated cuprous cyanide from said solution.

4. Method of producing cuprous cyanide which comprises providing an impure acidic solution containing cuprous chloride containing an iron compound and alkali metal chloride and adding thereto a solution of sodium cyanide in such quantity as to precipitate cuprous cyanide and leave in solution a concentration of cuprous chloride equivalent to at least 0.5 gram of copper per liter while maintaining the solution in a condition of acidity and preventing substantial oxidation of cuprous compounds by suitable additions of a reducing agent and removing precipitated cuprous cyanide from said solution.

5. In a process for preparing cuprous cyanide by the addition of an alkali metal cyanide to a cuprous chloride solution, the method comprising maintaining said solution in a state of acidity and maintaining an excess of cuprous chloride equivalent to at least 0.5 gram of copper per liter in said solution during the entire course of said addition of cyanide.

6. In a process for preparing cuprous cyanide by the addition of an alkali metal cyanide to a solution of a cuprous salt, the method comprising maintaining said solution in a state of acidity and maintaining an excess of dissolved cuprous salt equivalent to at least 0.5 gram of copper per liter in said solution during the entire course of said addition of cyanide.

CHARLES DANGELMAJER.